United States Patent [19]

Yoneda et al.

[11] 4,327,598

[45] May 4, 1982

[54] GEAR TRANSMISSION APPARATUS FOR AN AUTOMOBILE

[75] Inventors: Tetsuzo Yoneda; Yoshitaka Sogo; Masami Fukushima, all of Toyota; Shinichi Miyagawa, Anjo, all of Japan

[73] Assignee: Toyota Jidosha Kogyo Kabushiki Kaisha, Toyota, Japan

[21] Appl. No.: 138,648

[22] Filed: Apr. 8, 1980

[30] Foreign Application Priority Data

Jan. 21, 1980 [JP] Japan ............ 55/004484[U]

[51] Int. Cl.³ .................................... F16H 57/04
[52] U.S. Cl. ........................... 74/467; 184/11 R; 308/187
[58] Field of Search ............ 74/467, 468, 339, 369, 74/377; 308/187; 184/6.12, 11 R; 415/88, 89

[56] References Cited

U.S. PATENT DOCUMENTS

| | | | |
|---|---|---|---|
| 2,247,732 | 7/1941 | Paton | 184/6.12 |
| 2,487,350 | 11/1949 | Markland | 184/11 R |
| 2,645,305 | 7/1953 | Roos | 184/11 R |
| 2,797,771 | 7/1957 | Orr | 184/11 R |
| 4,221,279 | 9/1980 | Jones | 184/11 R |

Primary Examiner—C. J. Husar
Assistant Examiner—Conrad Berman
Attorney, Agent, or Firm—Stevens, Davis, Miller & Mosher

[57] ABSTRACT

A gear transmission apparatus for a motor vehicle, provided with an input shaft having an input gear, a counter shaft having a counter gear meshing with the input gear, an output shaft having a front end portion inserted into the input gear via a pilot bearing device, and a transmission mechanism for transmitting the rotation of the input shaft to the output shaft under predetermined gear ratios. The apparatus is further provided with at least one substantially radially extending and forwardly inclined oil passageway rotating together with the input gear, and a stationarily mounted guide plate adapted for directing lubricant oil toward the outer end of the passageway. The oil is effectively directed to the pilot bearing device via the passageway.

5 Claims, 5 Drawing Figures

GEAR TRANSMISSION APPARATUS FOR AN AUTOMOBILE

FIELD OF THE INVENTION

The present invention relates to a gear transmission apparatus, and more particularly relates to a device for lubricating a bearing portion between an input shaft and an output shaft fitted to each other in a gear transmission apparatus for an automobile.

BACKGROUND OF THE INVENTION

In a gear transmission apparatus for an automobile, an input shaft is, at a rear portion thereof, provided with an input gear that meshes with a counter gear on the counter shaft located below the input shaft. An output shaft is, at a front portion thereof, fitted to and supported by the rear portion of the input shaft by a bearing unit (a so-called pilot bearing). The bearing unit allows the relative rotation during the non direct drive mode of the transmission wherein the rotation of the input shaft is transmitted to the output shaft via the counter shaft under predetermined gear ratios.

In the conventional transmission apparatus, the lubricant oil is supplied to the pilot bearing via oil holes formed in the input gear so that they are opened to bottom portions of spaces formed between adjacent teeth of the input gear. The lubricant oil is, under the force generated between the input gear and the counter gear meshing with each other, urged into the oil holes. Thus, the lubrication of the pilot bearing is effected by the oil from the oil holes.

However, prior art suffers from the drawback that an amount of oil sufficient for effectively lubricating the pilot bearing is not directed to the oil holes. This is especially true when gears of small pitch are utilized in order to decrease the operational noise generated by the gears, since the formation of oil holes of large diameter is difficult due to the small distance between the adjacent teeth of the input gear.

SUMMARY OF THE INVENTION

An object of the present invention is to provide a device for lubricating the pilot bearing in an automobile transmission, capable of supplying a large amount of lubricant oil to the pilot bearing even if the pitch of the gears of the transmission apparatus is small.

The gear transmission of the present invention comprises a casing in which is rotatably mounted input, output, and counter shafts. On the end of the input shaft inside the casing is mounted an input gear which meshes with a counter gear mounted on the counter shaft. One end of the output shaft is mounted in an opening of the input gear. A rotating radial passageway adjacent to the input gear extends from the opening inside the input gear to the outside of the input gear. The passageway is inclined in the direction of rotation so as to hydromechanically pump oil down to the bearing supporting the end of the output shaft inside the input gear. A guide plate directs oil sprayed off the counter-gear to an area in which the oil is fed into the passageway.

DETAILED DESCRIPTION OF THE DRAWINGS

DESCRIPTION OF A PREFERRED EMBODIMENT

Figure 1:
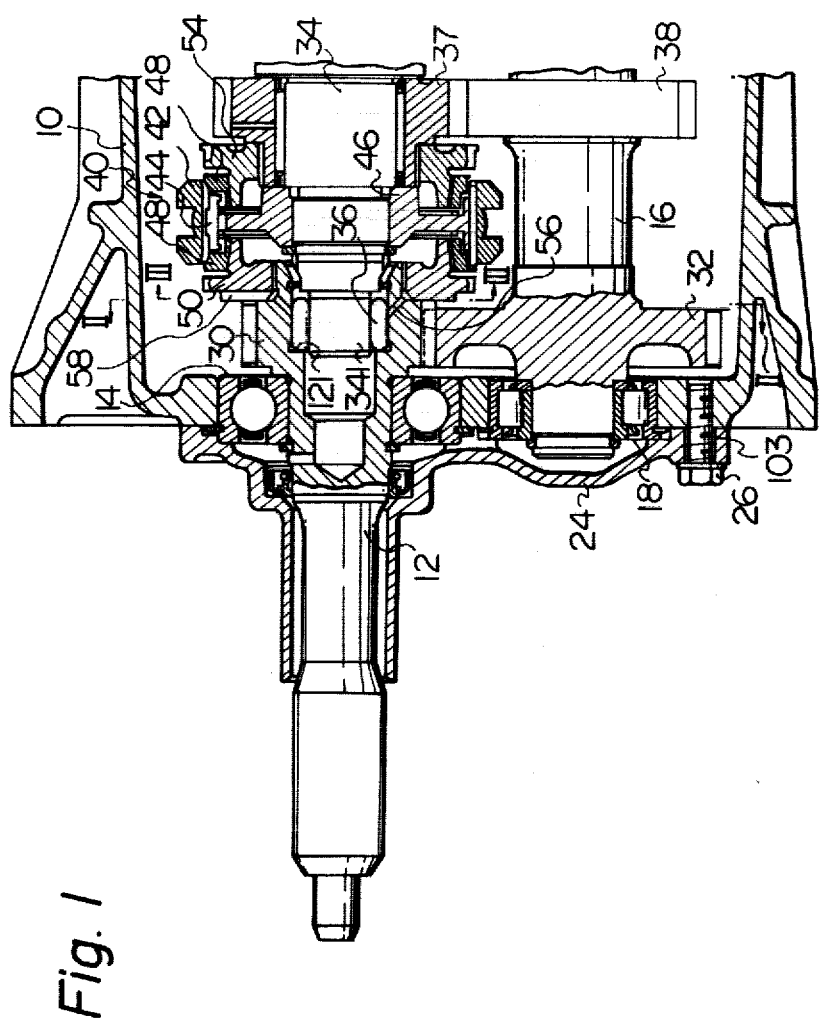
FIG. 1, is a cross-sectional view of the gear transmission.

Referring to FIG. 1, reference numeral 10 designates a transmission casing, at a front portion of which an input shaft 12 is supported by a ball bearing unit 14. The input shaft 12 is adapted to be connected to a clutch (not illustrated) of a motor vehicle. At a position located below the input shaft 12 in the casing 10, a counter shaft 16 is, on one end thereof, supported by a roller bearing unit 18. It should be noted that the casing 10 has at the front end thereof circular openings 101 and 102 (FIG. 2) adapted for receiving the ball bearing unit 14 and the roller bearing unit 18, respectively.

Figure 2:
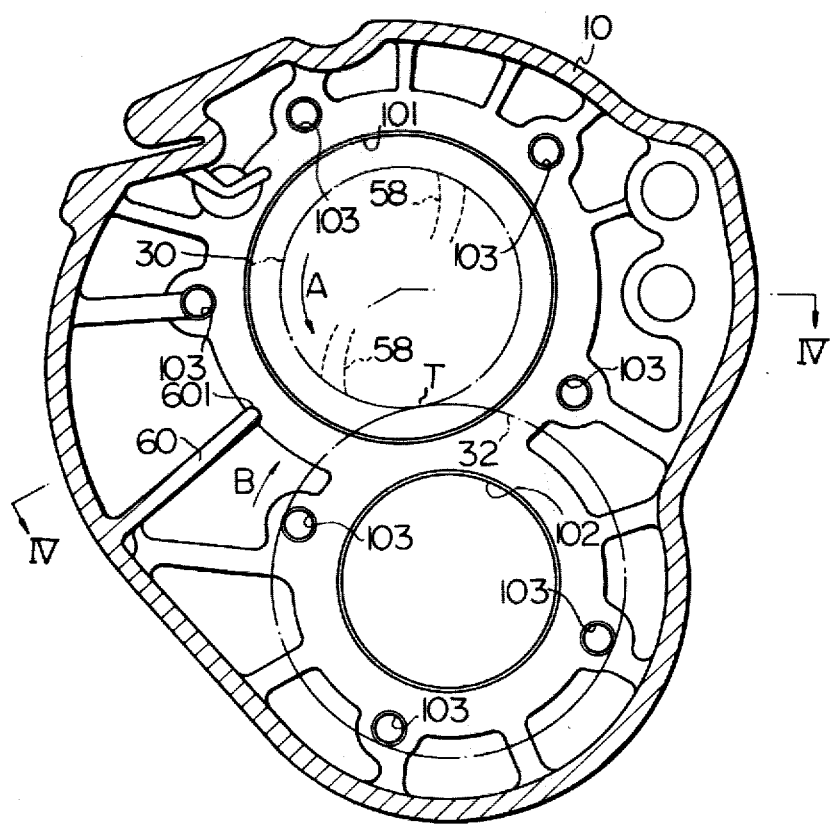
FIG. 2, is a cross-sectional view of the casing taken along plane II of FIG. 1.

A cover plate 24 is connected to the casing 10 by bolts 26 for closing the front end portion of the casing 10 and for placing the bearing units 14 and 18 on respective portions. As illustrated in FIg. 2, the casing is provided with a plurality of threaded openings 103 to which the respective bolts 26 (FIG. 1) are screwed.

Figure 5:
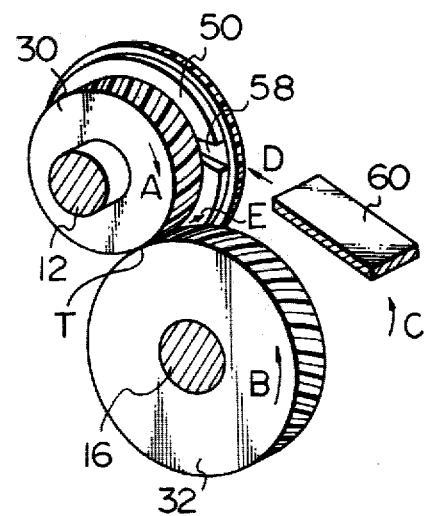

As illustrated in FIG. 1, an input gear 30 is integrally formed on a rear portion of the input shaft 12. The input gear 30 meshes with a counter gear 32 which is integrally formed on a front end of the counter shaft 16, so that the rotation of the input shaft 12 is transmitted to the counter shaft 16. Preferably, the input gear 30 and the counter gear 32, as illustrated in FIG. 5, the so-called helical type wherein each of the teeth of the gear 30 or 32 is inclined with respect to the direction of the axis of the gears.

The input gear 30 has, as illustrated in FIG. 1, an axial circular opening 121, into which a front end of an output shaft 34 is inserted. The output shaft 34 is, at the other end thereof, connected to a propellar shaft (not illustrated) of the vehicle. A bearing unit (a so-called pilot bearing device), comprising a plurality of needle bearing members 36 is arranged between an inner surface of the opening 121 and an outer surface of the output shaft 34, so that a relative rotation between the shafts 12 and 34 is obtained. On the output shaft 34, a plurality of transmission gears 37 (only one of which is illustrated in FIG. 1) are rotatably mounted, each of which gears 37 meshes with a respective counter gear 38 formed integrally on the counter shaft 16. Reference numeral 40 generally designates a synchronized shifting unit. The unit 40 includes a hub sleeve 42 which is in spline engagement to a clutch hub 46 fixedly fitted to the output shaft 34, so that the hub sleeve 42 is axially slidable with respect to the clutch hub 46 while rotating together with each other. Three shifting keys 44 urged outwardly by springs are arranged between the hub sleeve 42 and the clutch hub 46. Synchronizer rings 48 are located between the hub sleeve 42 and a spline piece 50 fixedly fitted to the input gear 30 and between the hub sleeve 42 and another spline piece 54 fixedly fitted to the transmission gear 37. As is well known to those skilled in this art, the hub sleeve 42 can mesh with the spline piece 50 or 54 after the rotation of the output shaft 34 and the rotation of the input shaft 12 or after the transmission gear 37 is cyncronized.

Figure 3:
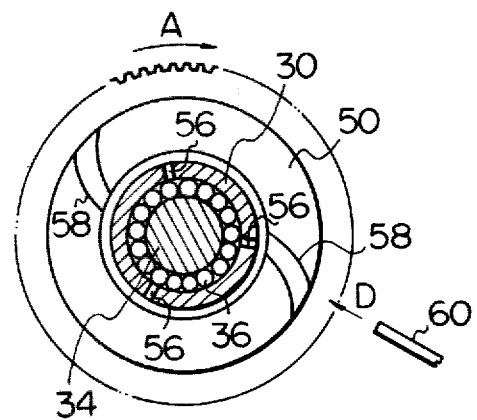
FIG. 3, is a cross-sectional view of the input gear and output shaft taken along plane III of FIG. 1.

The transmission gear apparatus of the present invention further provides a device for supplying a lubricant oil to the needle bearings 36, which will be described hereinbelow. As illustrated in FIGS. 1 and 3, the input gear 30 is provided with circumferentially spaced apart oil holes 56, each of which is, at an inner end thereof, opened to the opening 121 in which the needle bearing members 36 are arranged, and, on the outer end thereof, opened to the side of the gear 30 which faces the spline piece 50 integral with the gear 30. The spline piece 50 has, at the side facing the input gear 30, at last radially extending oil groove 58. In the embodiment as illustrated in Flg. 3, two diametrically opposed grooves 58 are provided. Each of the grooves 58 is, in the direction of the rotation of the input gear 30 as illustrated by arrow A, forwardly inclined. Preferably, each of the grooves 58 is forwardly inclined so that the lubricant oil received by the outer end of the groove is sucked under the effect of hydrodynamic force created by the rotating passageway into the groove.

Figure 4:
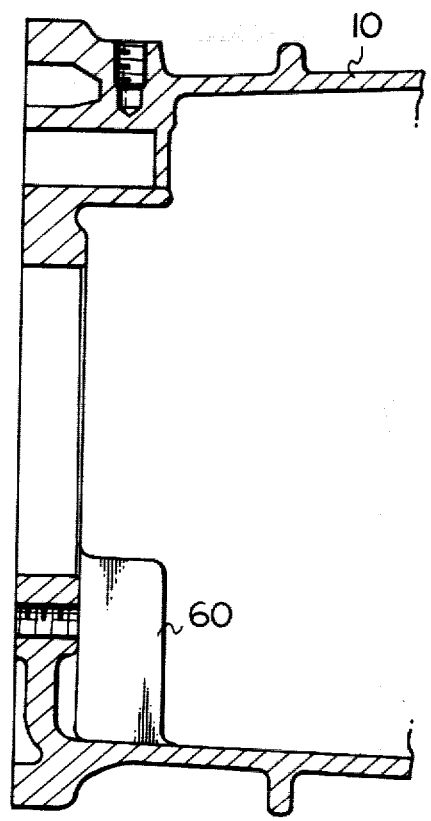
FIG. 4, is a cross-sectional view of the front portion of the casing taken along plane IV of FIG. 2; and, FIG. 5, is a perspective view of the input and counter gears.

As illustrated in FIG. 2, the casing 10 has, at the inner surface thereof, an oil guiding plate 60 which is located on one side of the counter gear 32 where the lubricant oil stored in the casing 10 is forcibly moved upwardly under the effect of the rotation of the counter gear 32. The guiding plate 60 inwardly extends to a position adjacent to a meshing point T of the input gear 30 and the counter gear 32, so that the lubricant oil is effectively directed to the meshing point T as well as the outer end of the oil grooves 58 formed on the side of spline piece 50 facing the input gear 30. As illustrated in FIG. 4, the guiding plate 60 also extends longitudinally. The plate 60 has a width sufficient enough for collecting large amount of lubricant oil to be directed to the meshing point T (the grooves 58) for effectively lubricating the needle bearing members 36 (FIG. 5).

An operation of the present invention will now be described. Since the input shaft 12, i.e., the input gear 30 is rotated in the direction of arrow A (FIG. 5), the counter shaft 16, i.e., the counter gear 32 is rotated in the direction of arrow B. The rotation of the counter gear 32 causes the lubricant oil stored in the bottom of the casing 10 to be upwardly moved in the direction of arrow C. The upwardly moved oil contacts with the guiding plate 60 and then is directed foward the input gear 30 in the direction of arrow D. A part of the directed oil is directly received by the curved grooves 58 which are integral with the input gear 30, since the grooves are curved and forwardly inclined in the direction of the rotation as illustrated by arrow A so that a hydrodynamic force for sucking the oil into the grooves is generated. Another part of the oil is collected by the teeth of the gears 30 and 32 meshing with each other, and is transfered to the meshing point T. The oil is then directed toward the grooves 58 in the direction of arrow E in FIG. 5. This is because the teeth of the helical gears 30 and 32 are inclined with respect to the axis of the gears so that a dynamic force for urging the oil backwardly along the axis is generated.

The oil thus introduced into the grooves 58 due to the above mentioned hydrodynamic force and the mechanical force is, via the oil holes 56 in FIG. 3 in the input gear 30, supplied to the needle bearing members 36. Therefore, the lubrication of the bearings 36 is effectively attained for allowing the relative rotation of between the input shaft 12 and the output shaft 34 when these shafts are not directly connected to each other.

It should be noted that the groove 58 is, at the outer end thereof, widened, so that the oil from th guiding plate 60 can be effectively collected by the groove.

The number of grooves 58 may be increased in order to collect a large amount of oil from the guiding plate 60 or the gears 30 and 32.

The groove may be a straight one which is forwardly inclined in the direction of the rotation thereof. A straight groove may be used when a large amount of lubricant is not needed by the needle bearing members 36.

Although an embodiment of the present invention is described with reference to the attached drawing, may modifications and changes can be made by those skilled in this art.

We claim:

1. A transmission gear apparatus comprising:
a casing assembly;
an input shaft rotatably mounted to the casing assembly;
an input gear on one end of the input shaft in the casing, said input gear having an axial opening;
a counter shaft rotatably mounted on the casing below the input shaft;
a counter gear on the counter shaft, which meshes with the input shaft;
an output shaft mounted on said casing having an end inserted into the opening of the input gear;
a transmission means for transmitting the rotation of the input shaft to the output shaft under predetermined gear ratios;
a bearing unit arranged in the opening for supporting said end of the output shaft in the input shaft;
at least one substantially radially extending rotatable passageway adjacent to said input gear, the inner radial end of said passageway being open to said bearing unit and the outer radial portion of said passageway being open to said input gear, said passageway being forwardly inclined in the direction of the rotation of the shaft, and;
guide plate means located on one side of the counter shaft wherein the lubricant oil is urged to move upwardly due to the rotation of the counter gear, said plate extending to a position near a point where the input gear and the counter gear mesh with each other, so that the lubricant oil is effectively received in the passageway in order to direct the lubricant oil to the bearing unit.

2. A transmission gear apparatus according to claim 1, wherein said transmission means comprises a synchronized shifting unit having a spline piece fixedly connected to the input gear, said spline piece being provided with at least one radially extending groove which is forwardly inclined in said direction of the rotation, and wherein said input gear is provided with at least one oil hole which is opened to the axial opening, said oil hole and said groove forming said passageway.

3. A transmission gear apparatus according to claim 2, wherein said groove is curved so that a hydrodynamic force is, during the rotation of the shaft, generated for inwardly introducing the oil received by the outer end of the groove.

4. A transmission gear apparatus according to claim 3, wherein said groove is, at the outer end thereof, widened for effectively receiving the oil.

5. In a transmission gear apparatus having an input shaft provided with an input gear, a counter shaft provided with a counter gear, an output shaft having an end supported by the input shaft, a bearing unit located between the input shaft and the output shaft, and a transmission gear mechanism having a synchronized shifting unit provided with a spline piece fixedly connected to the input gear, the improvement wherein said spline piece is provided with at least one radially extending groove inclined forwardly in the direction of the rotation of the input shaft, said input gear is provided with at least one oil hole for communicating the groove with the bearing unit, and a guide plate is stationarily arranged on one side of the counter shaft so that the lubricant oil urged upwardly is directed to a point where the input gear meshes with the counter gear.

* * * * *